(12) United States Patent
Vialle et al.

(10) Patent No.: US 6,961,424 B1
(45) Date of Patent: Nov. 1, 2005

(54) PROTECTED MECHANISM FOR DTMF RELAY

(75) Inventors: Jerome Vialle, Nice (FR); Michael Whitfield, Valbonne (FR); Remy Gauguey, Mougins (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 625 days.

(21) Appl. No.: 10/081,509

(22) Filed: Feb. 21, 2002

(51) Int. Cl.$^7$ .............................................. H04M 3/00
(52) U.S. Cl. ................ 379/418; 379/352; 379/356.01; 379/357.04
(58) Field of Search .......................... 379/352, 356.01, 379/357.04, 418

(56) References Cited

U.S. PATENT DOCUMENTS 5,583,933 A * 12/1996 Mark .................... 379/357.04

\* cited by examiner

*Primary Examiner*—Jefferey F. Harold
(74) *Attorney, Agent, or Firm*—Farjami & Farjami LLP (57) ABSTRACT

There is provided methods and devices for relaying tone events in a communication system. A first tone data indicative of a first tone is received and buffered. Following, a second tone data indicative of a second tone is received and buffered. The first and second tones can be, for example, DTMF digits. A processor retrieves the first tone data from the buffer and generates the first tone corresponding to the first tone data. The first tone is generated for at least a first predetermined period, which can be approximately 50 msec, for example. After the first tone has ended, the processor waits for a second predetermined period before retrieving the second tone data from the buffer. The second predetermined period can be, for example, 50 msec. Subsequently, the second tone corresponding to the second tone data is generated for at least the first predetermined period of time.

35 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
| 2 |0|0|   0   |0|     96      |              28               |
+-+-+-+-+-+-+-+-+-+-+-+-+-+-+-+-+-+-+-+-+-+-+-+-+-+-+-+-+-+-+-+-+
|                           timestamp                           |
|                             11200                             |
+-+-+-+-+-+-+-+-+-+-+-+-+-+-+-+-+-+-+-+-+-+-+-+-+-+-+-+-+-+-+-+-+
|                 synchronization source (SSRC) identifier      |
|                             0x5234a8                          |
+-+-+-+-+-+-+-+-+-+-+-+-+-+-+-+-+-+-+-+-+-+-+-+-+-+-+-+-+-+-+-+-+
|F|  block PT   |       timestamp offset      |  block length   |
|1|     97      |            11200            |        4        |
+-+-+-+-+-+-+-+-+-+-+-+-+-+-+-+-+-+-+-+-+-+-+-+-+-+-+-+-+-+-+-+-+
|F|  block PT   |       timestamp offset      |  block length   |
|1|     97      |      11200 - 6400 = 4800    |        4        |
+-+-+-+-+-+-+-+-+-+-+-+-+-+-+-+-+-+-+-+-+-+-+-+-+-+-+-+-+-+-+-+-+
|F|  Block PT   |
|0|     97      |
+-+-+-+-+-+-+-+-+-+-+-+-+-+-+-+-+-+-+-+-+-+-+-+-+-+-+-+-+-+-+-+-+
|     digit     |E R|  volume   |            duration           |
|       9       |1 0|     7     |              1600             |
+-+-+-+-+-+-+-+-+-+-+-+-+-+-+-+-+-+-+-+-+-+-+-+-+-+-+-+-+-+-+-+-+
|     digit     |E R|  volume   |            duration           |
|       1       |1 0|    10     |              2000             |
+-+-+-+-+-+-+-+-+-+-+-+-+-+-+-+-+-+-+-+-+-+-+-+-+-+-+-+-+-+-+-+-+
|     digit     |E R|  volume   |            duration           |
|       1       |0 0|    20     |              400              |
+-+-+-+-+-+-+-+-+-+-+-+-+-+-+-+-+-+-+-+-+-+-+-+-+-+-+-+-+-+-+-+-+
```

PROTECTED MECHANISM FOR DTMF RELAY

BACKGROUND OF THE INVENTION

1. Field of the Invention

The present invention generally relates to communication over a packet network and, more particularly, to processing and generating DTMF signals in the packet network.

2. Related Art

The packetizing of voice signals for transmission over a packet network, (i.e., Voice over Packet or "VoP"), has been recognized as a less expensive, yet effective, alternative to traditional telephone service. The term VoP is an umbrella term that can include, for example, VoIP, VoATM, VoDSL and other types of services utilizing packetized voice data.

Figure 1A:
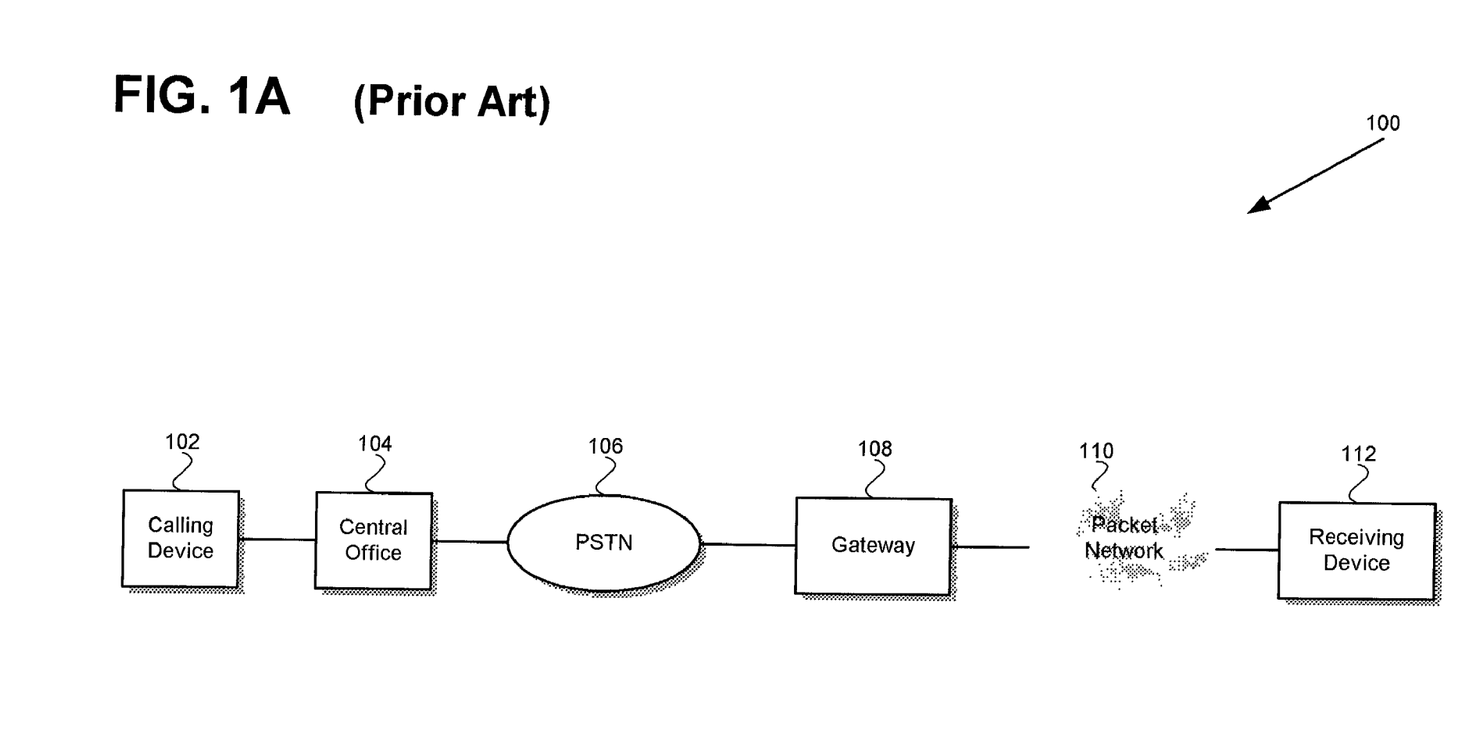
FIG. 1A illustrates a conventional communication system for communicating voice over packet network.

Referring to FIG. 1A, conventional communication system 100 is used to illustrate the architecture and operation of a typical VoP network. As shown, communication system 100 comprises calling device 102, which can be an analog telephone, for example. An analog voice signal from calling device 102, generated by a client speaking into the device's microphone, for example, travels over copper wires (i.e., the local loop) to central office 104, where the analog voice signal can be digitized using a conversion standard, such as G.711. The digitized voice signal is then transmitted over public switched telephone network ("PSTN") 106 to gateway 108.

At gateway 108, which is situated on the emitting side of packet network 110, for purposes of the present illustration, the digitized voice signal is compressed and packetized for transmission over packet network 110. The compression of the speech signal at gateway 108 can be performed by a low-rate voice codec such as, for example, either G.723 or G.729, thus reducing the amount of data that has to be packetized and sent over packet network 110 to receiving device 112. Receiving device 112 can be, for example, a gateway or application server configured to receive and process packets from packet network 110. For example, receiving device 112 may depacketize and decompress the voice signal carried by the packets arriving from packet network 110. The voice signal can then be relayed to another central office, for example, and eventually to the called party.

One challenge facing the telecommunications industry is the effective processing of dual-tone multifrequency ("DTMF") signals in a packet architecture. DTMF tones refer to the tones generated by pressing the buttons (i.e., the digits) on the keypad of a touch-tone telephone, which typically has twelve digits (i.e., numbers 1–9, the asterisk "*", and the pound sign "#"). In some cases, buttons having letters A, B, C, or D may also be found on certain telephone models, bringing the total numbers of buttons on such telephones to sixteen. Each button on a telephone's keypad is assigned a specific and distinct tone produced by the combination of two tones of different frequencies. For example, digit "1" is composed of 1200 Hz and 697 Hz tone pair, digit "#" is composed of 1477 Hz and 941 Hz tone pair, and digit "B" is composed of 1633 Hz and 770 Hz tone pair. Manifestly, sixteen frequency or tone pairs have been designated and reserved to represent the sixteen DTMF digits. DTMF digits can be specified as named telephony events, or "NTE." Alternatively, the frequencies and levels of the tones can be specified directly as telephony tones, or "TT."

The uniqueness of the tones associated with the DTMF digits is exploited for general signaling purposes, such as when dialing a particular telephone number. DTMF tones are also commonly utilized as a means for selecting specific items from a menu, for example, or for accessing specific applications offered by an application server during a "voice" call. By way of illustration, a caller dialing into a governmental agency, for instance, may be routed through a series of steps whereby each step is initiated by the caller entering the appropriate digit in order to arrive at a desired destination, service, application or the like. In order for this process to proceed properly and effectively, the receiving device at the governmental agency must be able to detect and recognize accurately the digits entered by the caller.

Moreover, specific standards have been implemented setting forth the requirements for DTMF detection. Such criteria as tone duration, tone separation and frequency deviation each must satisfy certain boundaries before a receiving device will recognize, or accept, a signal as a legitimate DTMF digit. For example, the duration of a tone must last for at least 40 msec before a DTMF digit is recognized. Also, the minimum interdigital interval (i.e., the "silence" period between two tones) must last for at least 40 msec in order for the receiving device to detect the presence of two separate DTMF digits; otherwise, the trailing tone may be discarded or treated as part of the leading tone. Requirements for the detection of DTMF digits can be found, for example, in standards promulgated by the Electronic Industries Alliance/Telecommunications Industry Association ("EIA/TIA") and the International Telecommunication Union-Telecommunication Standards Sector ("ITU-T").

As described above, voice signals can be compressed at gateway 108, for example, using low-rate voice codecs such as G.723 or G.729 for more efficient transmission of voice data across a packet network. However, these speech compression standards have proven to be unsatisfactory for proper handling of DTMF tones. More specifically, when subjected to the same type of compression as voice signals, DTMF tones are often unacceptably distorted. As a consequence, the tones generated and packetized by the transmitting gateway can be inaccurate, leading to poor detection and recognition by a receiving device on the other side of the packet network.

In order to improve DTMF relay across a packet network, DTMF digits may be processed at the gateway independently of the voice signal, even when both are received from the same device. As such, the DTMF tones do not have to undergo the same type of compression as the voice signal. One format for packetizing DTMF digits independently of voice signals for transmission across a packet network is the Internet Engineering Task Force's ("IETF") Request For Comment 2833 ("RFC2833").

Figure 1B:
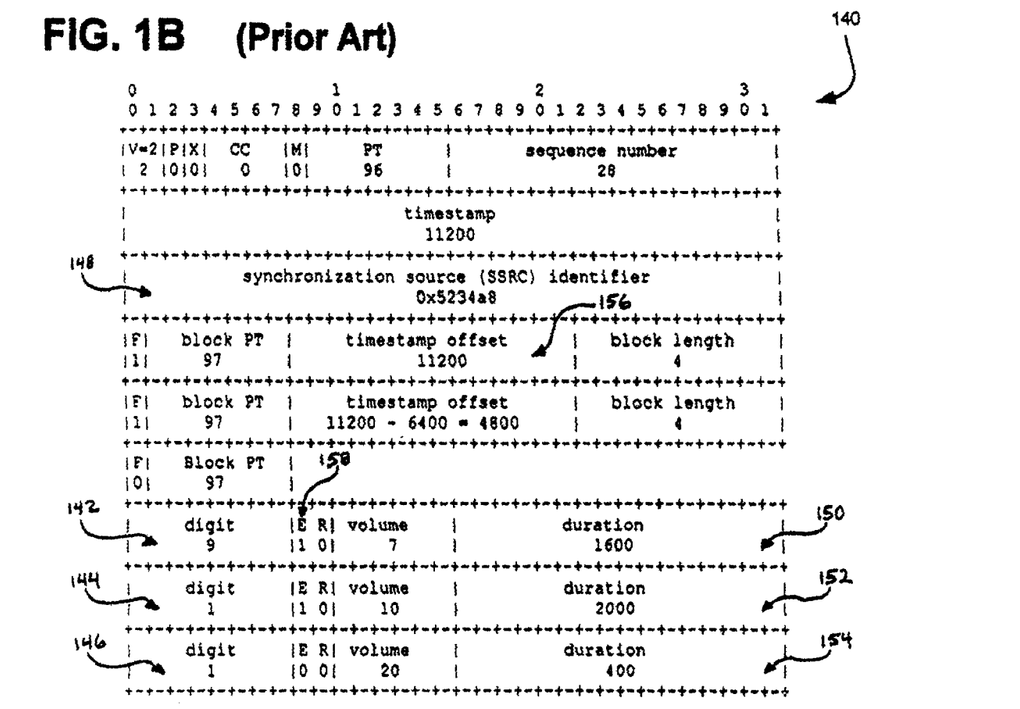
FIG. 1B illustrates a conventional RFC2833-type packet for transporting DTMF digits.

Reference is now made to FIG. 1B, which illustrates an example of an RFC2833-type packet for transporting DTMF digits. As shown, packet 140 is transporting three DTMF tones, i.e., DTMF tones 142, 144 and 146, which code DTMF digits 9, 1 and 1, respectively. The on/off status of a tone is indicated by its associated end or "E" bit. For example, E bit 160 for DTMF tone 142 is set to 1, which means that DTMF tone 142 is off, while E bit 162 for DTMF tone 146 is set to 0, which means that DTMF tone 146 is on. The duration of each tone is coded in its duration field. For example, DTMF tone 142 had a duration of 1600 timestamp units as indicated by duration field 150, while DTMF tone 144 had a duration of 2000 timestamp units as indicated by duration field 152. DTMF tone 146 (which is still on based on the setting of its E bit), has been on for 400 timestamp units as indicated by duration field 154. Timestamp field 148 indicates that the last event being transported by packet 140 (i.e., DTMF tone 146), was pressed or entered by the calling party at time 11200 (in timestamp units), assuming that the first tone carried by packet 140 (i.e., DTMF tone 142) was entered at time 0. Timestamp offset fields 156 and 158 are used to code the length of time since DTMF tone 142 and DTMF tone 144, respectively, were first detected by the emitting device.

Although RFC2833 provides an effective means for packetizing DTMF digits by the device on the emitting side of a packet network, serious issues and drawbacks remain with the processing of such packets on the receiving side of the packet network. For example, due to packet loss and other deficiencies associated with packet networks, the device responsible for processing DTMF digits on the receiving side of the packet network may not receive all the packets needed to regenerate the digits reliably. Such a case may arise, for example, when end-of-event packets signaling that a tone has ended are lost, in which case the receiving device may end up regenerating a digit for an indefinite length of time. As another example, start-of-tone packets may be lost, resulting in improper initiation of tone regeneration by the receiving device.

By way of illustration of how packet loss can impact reliable DTMF relay, consider a scenario involving the following six packets: (1) packet A indicates that a first tone has started; (2) packet B is a keep-alive packet for the first tone; (3) packet C indicates that the first tone has finished; (4) packet D indicates that a second tone has started; (5) packet E is a keep-alive packet for the second tone; and (6) packet F indicates that the second tone has finished. In this scenario, the time period between the transmission of packet A and packet C is sufficient for a receiving device to detect the DTMF digit. However, the period between the transmission of packets B and C is not sufficiently long for proper detection. Thus, if packet A is lost, the receiving device would detect packet B as the start of the first tone and would end the first tone with packet C, and the duration of the regenerated tone would not be long enough to be valid. As another example, when packet C is lost, the tone starts with packet A but would not end until packet D is received. But because packet D indicates the start of a second tone, the second tone would be regenerated immediately following cessation of the first tone. In such case, there is an insufficient off time between the first tone and the second tone, and the DTMF sequence would be considered invalid.

Currently known schemes directed to transmitting DTMF digits across a packet network reliably have proven inadequate in several respects. For example, one known scheme involves retransmitting packets as often as necessary to compensate for lost packets. However, such an approach introduces unacceptably long delays into the system since time has to be allotted for receipt acknowledgement and possible re-transmission. Furthermore, since real-time voice transport seldom uses error correction, a DTMF relay scheme which relies on retransmission and error correction may need a separate transport layer from that used for voice transmission, thus adding implementation complexity. Other approaches may involve using different redundancy schemes to alleviate the impact of packet loss. As a general point, however, the requirements for accurate DTMF relay as applied to VoP under present standards and proposals are not adequately addressed.

Thus, there is an intense need in the art for an improved approach to DTMF processing over packet networks that can overcome the shortcomings of the existing designs and can provide a more reliable and accurate detection and recognition of DTMF digits.

SUMMARY OF THE INVENTION

In accordance with the purpose of the present invention as broadly described herein, there is provided methods and devices for relaying tone events in a communication system. In one aspect of the invention, a first tone data indicative of a first tone is received by a receiver element and buffered in a memory element. Following, a second tone data indicative of a second tone is received and buffered in the memory element. The first and second tones can be, for example, DTMF digits. A processor next retrieves the first tone data from the memory element and generates the first tone corresponding to the first tone data. Using a timer element, for example, the processor generates the first tone for at least a first predetermined period, which can be approximately 50 msec, for example. After the first tone has ended, the processor waits for a second predetermined period before retrieving the second tone data from the buffer. The second predetermined period can be, for example, 50 msec. Subsequently, the processor generates the second tone corresponding to the second tone data for at least the first predetermined period of time. In one aspect, the second tone can be generated until an end of tone data is received.

In another aspect, a first tone data and a first tone duration are received, where the first tone data is indicative of a first tone, the first tone data is then buffered and retrieved, and the first tone corresponding to the first tone data is generated. A first timer set to a first predetermined period is started when the first tone starts being generated. For example, the first predetermined period can be 200 msec. Thereafter, the first timer is restarted when a keep-alive data for the first tone is received, in which case the first tone continues to be generated. Otherwise, the first tone is stopped when the first timer expires. In one aspect, when a second tone data indicative of a second tone is received prior to the first tone ending, an elapsed time since the first tone began is determined. Next, the first tone is stopped when the elapsed time exceeds a second predetermined period, which can be, for example, 50 msec. A third predetermined period is then allowed to pass before the second tone corresponding to the second tone data is generated.

In a further aspect a first tone data and a first tone duration are received, where the first tone data is indicative of a first tone, and the first tone data is buffered. Also, a second tone data and a second tone duration are received, where the second tone data is indicative of a second tone, and the second tone data is stored in the buffer. A fixed tone period and a fixed silence period are provided, which are independent of the first tone duration and the second tone duration. The first tone data is retrieved from the buffer and the first tone corresponding to the first tone data is generated for the fixed tone period. Next, the second tone data is retrieved from the buffer and, after waiting for the fixed silence period, the second tone corresponding to the second tone data is generated for the fixed tone period.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein. It should be appreciated that the particular implementations shown and described herein are merely exemplary and are not intended to limit the scope of the present invention in any way.

Figure 2:
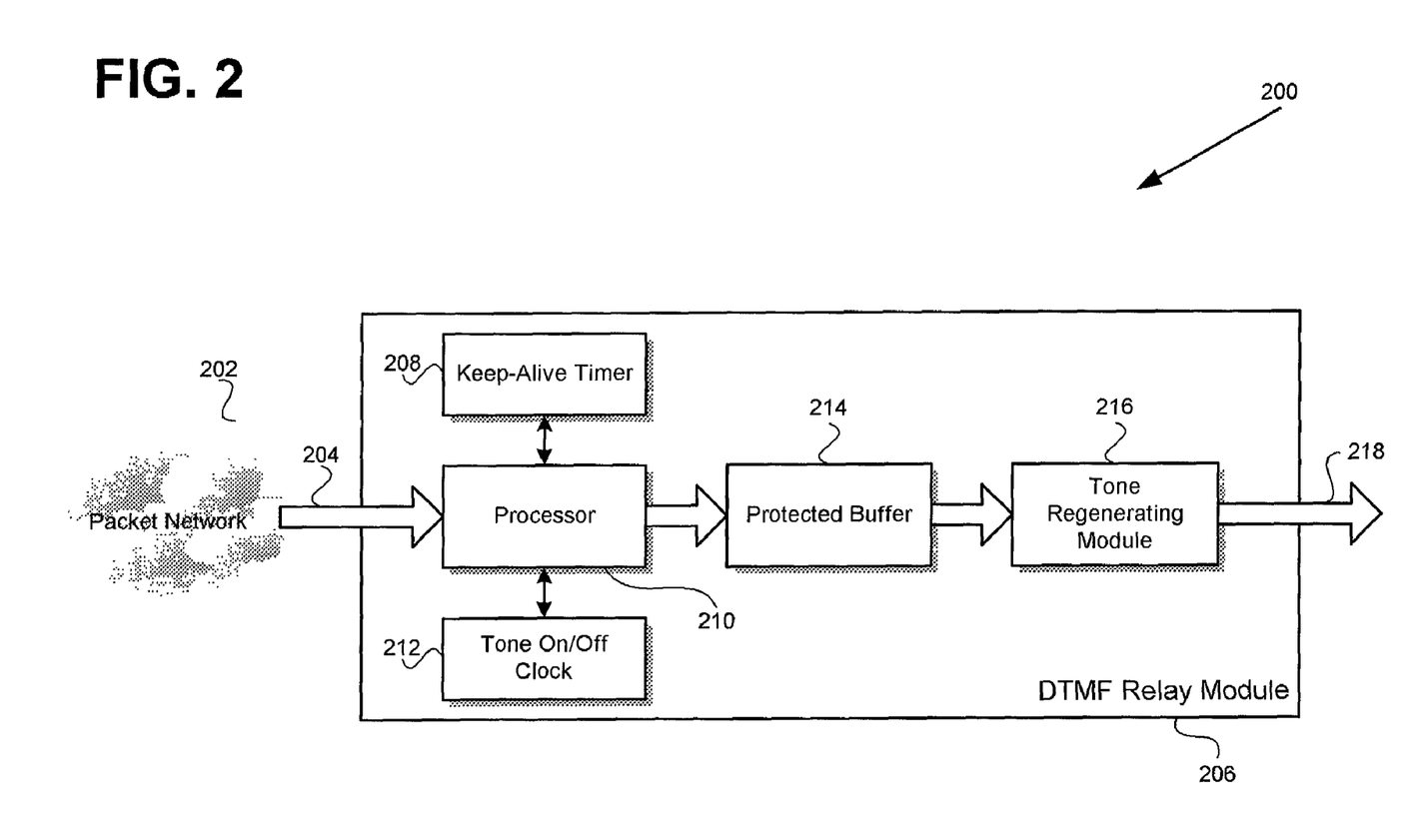
FIG. 2 illustrates a DTMF relay system for processing and generating DTMF signals according to one embodiment of the present invention.

FIG. 2 illustrates exemplary DTMF relay system 200 for processing and generating DTMF signals, according to one embodiment of the present invention. As shown, DTMF relay system 200 includes dual tone multi-frequency ("DTMF") relay module 206, which is situated at the receiving side of packet network 202, and which is configured to receive NTE packets 204 from packet network 202. DTMF relay module 206 can be, for example, part of a remote access server, a media gateway or other end equipment that receives and processes packetized data. Packet network 202 can be the Internet or other packet-based networks across which NTE's, such as DTMF and other tone signals, may be transmitted utilizing suitable packet formats. For example, NTE payloads may be packetized by a gateway (not shown) at the emitting side of packet network 202 and sent across packet network 202 to DTMF relay module 206 in accordance with the IETF format RFC2833, as discussed above.

In the present embodiment, packets from packet network 202 containing NTE payloads are processed by DTMF relay module 206. DTMF relay module 206 can be configured to determine which of the incoming packets are carrying DTMF digits and to regenerate DTMF digits, when they are detected, for transmission to a receiving device (not shown) such that enhanced DTMF detection and recognition by the receiving device are achieved. For example, DTMF relay module 206 may regenerate DTMF digits by suitably creating tones in a manner that meets the requirements of the EIA/TIA and ITU-T specifications for DTMF detection.

As shown in FIG. 2, DTMF relay module 206 comprises keep-alive timer 208, processor 210, tone on/off clock 212, protected buffer 214 and tone regenerating module 216.

NTE packets 204 arriving from packet network 202 may be initially received by processor 210, which can be configured to analyze the contents of each of such incoming packets in order to determine whether a packet is carrying a DTMF digit. According to the RFC2833 format, for example, the particular NTE payload of a packet is indicated in the packet's event field. More specifically, digits zero through fifteen have been reserved for the sixteen DTMF digits, whereby each reserved digit corresponds to a particular DTMF tone. Thus, based on the information contained in the packet, processor 210 can determine whether the packet is carrying a DTMF digit or some other NTE, as well as which particular DTMF digit is being transported by the packet. Packets carrying DTMF payloads are subject to further processing by processor 210, while processing of non-DTMF packets may cease.

Processor 210 can also be configured to determine the on/off status of a DTMF digit carried by an incoming packet based on the information contained in the packet. As discussed above, the on/off status of a DTMF tone is indicated by the end, or "E", bit in the packet, which is set by the device responsible for packetizing the digit (e.g., an emitting gateway). An end bit set to the value of "1", for example, indicates that the tone is off and signifies an "end-of-event" packet. On the other hand, an end bit set to "0" indicates that the payload in the packet is either new, or else that the packet is a "keep-alive" packet, depending on, for example, the packet's timestamp. Keep-alive packets refer to those packets that carry DTMF digits that already have an on status. It is noted that RFC2833 permits packetizing more than one NTE per packet, in which case processor 210 may identify the specific character of each NTE in the packet from its corresponding event field and may further identify the on/off status of each detected DTMF digit, if any, from its associated end bit.

In instances where processor 210 detects that a received packet is carrying a DTMF digit, processor 210 can derive additional data from the packet in order to determine whether it is desirable for the DTMF digit to be regenerated. The process involved in making this determination is described in greater detail below in relation to FIG. 3. Once processor 210 determines that a detected DTMF digit should be regenerated, processor 210 checks to determine whether protected buffer 214 is full. In one embodiment, if protected buffer 214 has space available, the DTMF digit is queued in protected buffer 214; otherwise, the DTMF digit may be dropped. Protected buffer 214 can be a memory element wherein DTMF digits may be sequentially queued and, when appropriate, sent to tone regenerating module 216 to be regenerated. Tone regenerating module 216 can regenerate a digit by recreating its tonal representation in a suitable manner known in the art. Digits regenerated by tone regenerating module 216 (i.e., regenerated tones 218) can then be sent to the receiving device.

Continuing with FIG. 2, one role of keep-alive timer 208 in the present embodiment is to prevent tone regenerating module 216 from regenerating a DTMF tone for an extended length of time, for example, when an end-of-event packet for the digit is not received by DTMF relay module 206. To this end, each time that tone regenerating module 216 begins regenerating a new DTMF digit, processor 210 sets keep-alive timer 208 to expire after a configurable period, which can be, for example, 200 msec. If an end-of-event packet for the digit is not received during this period (i.e., prior to the expiration of keep-alive timer 208), then processor 210 may signal tone regenerating module 216 to stop the tone when keep-alive timer 208 expires. In one embodiment, processor 210 may restart keep-alive timer 208 each time a keep-alive packet for the digit is received before keep-alive timer 208 expires. It should be noted that processor 210 may signal tone regenerating module 216 to discontinue a tone in the event that an end-of-event packet for the digit arrives at DTMF relay module 206 prior to the expiration of keep-alive timer 208. Moreover, once keep-alive timer 208 has expired and tone regenerating module 216 has stopped the tone, all subsequent packets, including keep-alive packets, arriving at DTMF relay module 206 for that particular digit may be dropped. In this manner, situations wherein a DTMF tone may be regenerated indefinitely due to the loss of end-of-event packets, for example, can be avoided.

Also shown as part of DTMF relay module 206 is tone on/off clock 210, which functions as a timer to make certain that the minimum tone on/off time requirements for proper DTMF tone recognition by a receiving device are properly met. Thus, each time tone regenerating module 216 begins regenerating a new DTMF digit, processor 210 can signal tone on/off clock 212 to begin tolling. Tone on/off clock 212 can be set to a desired length of time not less than the minimum tone duration required for proper DTMF recognition by a receiving device. For example, tone on/off clock 212 may be set to expire after 50 msec following the start of a new tone by tone regenerating module 216. During this interval processor 210 may ignore end-of-event packets and other tone-termination indicators (for example, as indicated by the packet's duration field), for the digit that may be received by DTMF relay module 206. As a result, tone on/off clock 212 prevents tone regenerating module 216 from regenerating a tone for too short a duration.

Tone on/off clock 212 can also be utilized to ensure that the time interval (i.e., the "off-time") between successive digits regenerated by tone regenerating module 216 is adequate, such that the minimum off-time interval required for detecting two separate DTMF tones is met. For example, for this purpose, tone on/off clock 212 may be set to expire 50 msec after tone regenerating module 216 stops the leading tone. The next DTMF digit queued in protected buffer 214, if any, is not sent to tone regenerating module 216 until tone on/off clock 212 expires. Thus, information regarding start of tone and other tone-initiating indicators carried by the packet for the trailing digit may be ignored in order to ensure that regeneration of successive DTMF tones satisfy the requirements for proper DTMF recognition.

Figure 3:
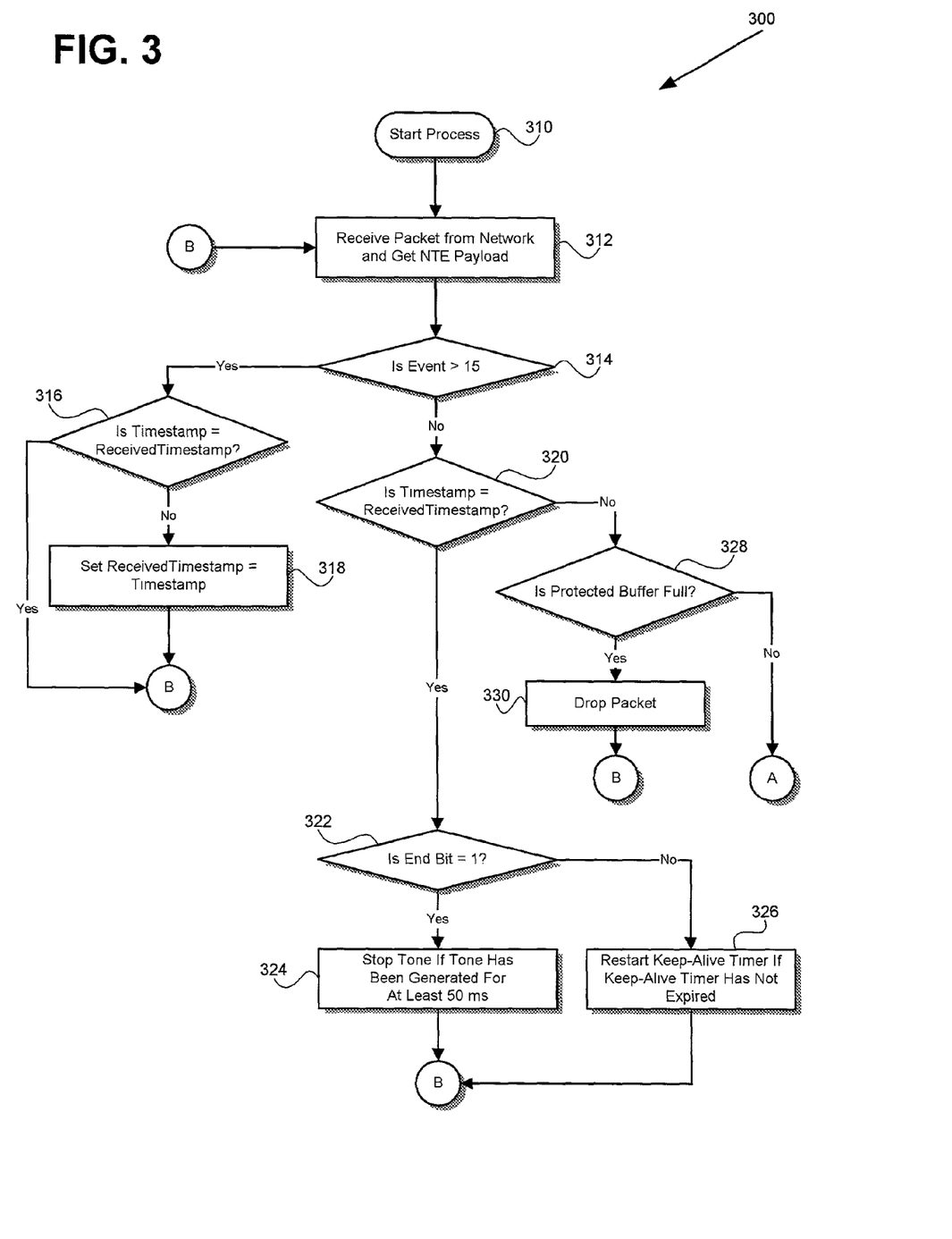
FIG. 3 illustrates an exemplary flow diagram of a communication method utilizing the DTMF relay system of FIG. 2.

Referring now to FIG. 3, DTMF relay method 300 illustrates the processing of NTE packets in accordance with one embodiment of the present invention. More particularly, DTMF relay method 300 illustrates how DTMF relay module 206 in FIG. 2 may proces packets arriving from packet network 202. As shown in FIG. 3, DTMF relay method 300 begins at step 312 where an NTE packet is received by DTMF relay module 206. Once the packet has been received, the NTE payload is analyzed by processor 210. Next, at step 314, processor 210 determines whether the packet is carrying a DTMF digit or some other type of NTE payload by analyzing the packet's event field. As stated above, digits 0 through 15 have been reserved for the sixteen DTMF digits. Thus, if the event field is greater than fifteen, it would indicate that the packet's payload is non-DTMF, and DTMF relay method 300 continues to step 316. If the event field is not greater than fifteen, then DTMF relay method 300 proceeds to step 320.

At step 316, the packet's timestamp is compared to the timestamp of a previously received packet or ReceivedTimestamp. If the packet's timestamp is the same as the ReceivedTimestamp, it would indicate that the packet is a redundant packet carrying the same payload as the previously received packet. On the other hand, if the packet's timestamp is different from the ReceivedTimestamp, it would indicate that the packet is not a redundant packet, but is instead carrying a new NTE. Thus, if processor 210 determines at step 316 that the packet's timestamp is the same as the ReceivedTimestamp, then the ReceivedTimestamp does not have to be updated, and DTMF relay method 300 returns to step 312 where the next packet can be received and processed. However, if the packet's timestamp is different from the ReceivedTimestamp, then the ReceivedTimestamp is updated and reset to the packet's timestamp at step 318, after which step DTMF relay method 300 returns to step 312.

Referring again to step 314, if the event field for the packet is not greater than fifteen, thus indicating that the packet is carrying a DTMF payload, then DTMF relay method 300 proceeds to step 320, where processing of packets carrying DTMF digits continues. At step 320, processor 210 compares the packet's timestamp with the ReceivedTimestamp, and if the packet's timestamp is the same as the ReceivedTimestamp, it would indicate that the packet is carrying the same DTMF digit as the DTMF digit carried by a previously received packet. DTMF relay method 300 would then continue to step 322 where processor 210 determines whether the packet's end bit is set to 1, representing an end-of-event packet and indicating that the tone should be off. If the end bit for the packet is found to be "1", then DTMF relay method 300 continues to step 324 where processor 210 signals tone regenerating module 216 to stop the tone, on condition that the tone has been regenerated for a sufficient length of time, which can be 50 msec, for example. Processor 210 can utilize tone on/off clock 212, for instance, to ensure that tone regenerating module 216 has regenerated the tone for at least 50 msec before signaling tone regenerating module 216 to turn off the tone. Thus, DTMF recognition by a receiving device is improved significantly, since all DTMF digits that are regenerated by tone regenerating module 216 satisfy the duration requirements for proper recognition. Next, DTMF relay method 300 then returns to step 312.

However, if it is determined at step 322 that the packet's end bit is "0", it would indicate that the packet is a keep-alive packet, and DTMF relay method would proceed to step 326. At step 326, processor 210 can restart keep-alive timer 208 if keep-alive timer 208 has not expired for the digit being regenerated. Following, DTMF relay method 300 returns to step 312.

Returning now to step 320, if processor 210 determines that the packet's timestamp is not the same as the ReceivedTimestamp, processor 210 may determine the packet is carrying a new or non-redundant DTMF digit. At this point, DTMF relay method 300 would proceed to step 328 where processor 210 determines whether protected buffer 214 is full. If protected buffer 214 is full, the packet may be dropped at step 330, and DTMF relay method 300 returns to step 312 where another NTE packet can be received and processed.

On the other hand, if protected buffer 214 is not full, then DTMF relay method 300 continues to step 332 where the DTMF digit from the packet is added to protected buffer 214. Next, at step 334, processor 210 analyzes the packet's end bit to determine whether it is "1" (i.e., that the packet is an end-of-event packet). If the end bit is not indicative of an end-of-event packet, then the packet is carrying either a new tone or a keep-alive payload, and thus, DTMF relay method continues at step 336 where the packet's DTMF digit is sent to tone regenerating module 216 for regeneration after a sufficient length of time (e.g., 50 msec), has elapsed since tone regenerating module 216 stopped the previous tone to ensure a proper interdigit delay. For example, processor 210 can utilize tone on/off clock 212 to monitor the elapsed time since the previous tone stopped being regenerated prior to sending the next digit from protected buffer 214 to tone regenerating module 216 for regeneration. Accordingly, DTMF recognition by a receiving device can be enhanced in this manner, because an adequate length of time is allowed to elapse before successive DTMF digits are regenerated. Also at step 336, processor 210 can start keep-alive timer 208 at the same time the next DTMF digit is sent to tone regenerating module 216 for regeneration. DTMF relay method 300 then continues to step 340.

If at step 334 it is determined instead that the packet's end bit is "1", it would indicate that the packet is an end-of-event packet, and DTMF relay method 300 would proceed to step 338. For example, the first packet arriving at DTMF relay module 206 indicative of a "new" digit may also simultaneously indicate an end-of-event packet, when all previous packets for that digit, such as start-of-tone and keep-alive packets, have been lost. At step 338, the DTMF digit is sent to tone regenerating module 216 for regeneration after a sufficient length of time has elapsed since the preceding tone was turned off. Again, processor 210 can utilize tone on/off clock 212 to track the elapsed time. Further, at step 338, tone on/off clock 312 can also be utilized to ensure that, once regeneration of the DTMF digit begins, it is regenerated for at least a sufficient duration to satisfy the requirements of DTMF recognition by a receiving device. For example, the duration can be set to 50 msec. DTMF relay method 300 then continues at step 340. At step 340, the ReceivedTimestamp is updated by setting it equal to the packet's timestamp. DTMF relay method 300 then returns to step 312.

In one embodiment, DTMF tone relay module 206 can be configured to receive and process packets carrying more than one NTE event. For example, under the IETF format (i.e., RFC2833), a packet can contain multiple NTE events, including DTMF and other types of events representable as tones. According to such embodiment, processor 210 analyzes the contents of a packet—most notably the characteristic of each event carried by the packet—in order to determine whether any of the events is a DTMF digit. Further, based on the packet's timestamp and the timestamp offset for each event in the packet, processor 210 can determine, for instance, whether a DTMF digit is on, is being "kept-alive," or is off. The information that processor 210 derives from the packet may also be used to establish which DTMF digits should be placed in protected buffer 214, as well as the proper sequence of digit placement into protected buffer 214. DTMF digits placed in protected buffer 214 can then be sequentially sent to tone regenerating module 216 for regeneration. According to this embodiment, processor 210 can utilize keep-alive timer 208 to limit the duration of tone regeneration to 200 msec, for example, in instances where an end-of-event packet for a digit is not received. Also, processor 210 can utilize tone on/off clock 212 to manage the regeneration of DTMF digits by tone regenerating module 216, such that no digit is regenerated for less than a desired length of time (e.g., 50 msec), sufficient for a receiving device to recognize the DTMF digit. At the same time, tone on/off clock 212 can also be used to ensure that successive DTMF digits are not regenerated too closely to one another and that the off-time requirements for DTMF detection and recognition are met. In this manner, improved DTMF detection is achieved because multiple DTMF digits in a packet are properly processed and, when appropriate, buffered for eventual regeneration. Moreover, DTMF digit regeneration may be controlled by specific time constraints and parameters such that the regenerated DTMF digits can be properly detected.

According to various embodiments of the present invention, for example, the DTMF tone for each digit is regenerated for at least a configurable length of time sufficient to satisfy the requirements for DTMF recognition. Further, an adequate interdigit delay is imposed between the regeneration of successive DTMF digits, such that the receiving device can properly detect the separation and distinguish successive digits. Even further, a mechanism is introduced to reduce the impact of packet lost by, for example, limiting the length of time a digit is regenerated even when end-of-event packets are not received.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A tone generation method for use in a communication system, said method comprising:
   receiving a first tone data and a first tone duration, said first tone data being indicative of a first tone;
   buffering said first tone data in a buffer;
   receiving a second tone data and a second tone duration, said second tone data being indicative of a second tone;
   buffering said second tone data in said buffer;
   retrieving said first tone data from said buffer;
   generating said first tone corresponding to said first tone data for at least a first predetermined period, said first predetermined period being independent of said first tone duration;
   waiting for a second predetermined period after said generating said first tone;
   retrieving said second tone data from said buffer; and
   generating said second tone corresponding to said second tone data for at least said first predetermined period, said first predetermined period being independent of said second tone duration.

2. The method of claim 1, wherein said first tone is a DTMF digit.

3. The method of claim 1, wherein said first predetermined period is approximately 50 msec.

4. The method of claim 1, wherein said second predetermined period is approximately 50 msec.

5. The method of claim 1, wherein said first tone data is a part of an NTE packet.

6. The method of claim 5, wherein said second tone data is a part of said NTE packet.

7. The method of claim 1, wherein said first tone is generated for approximately 40 ms.

8. A tone generation device for use in a communication system, said device comprising:
   a receiver capable of receiving a first tone data and a first tone duration, said first tone data being indicative of a first tone, and said receiver further capable of receiving a second tone data and a second tone duration, said second tone data being indicative of a second tone;
   a memory; and
   a processor capable of storing said first tone data and said second tone data in said memory;
   wherein said processor retrieves said first tone data from said memory and generates said first tone corresponding to said first tone data for at least a first predetermined period, wherein said first predetermined period is independent of said first tone duration, wherein said processor waits for a second predetermined period after generating said first tone, and wherein said processor retrieves said second tone data from said memory and generates said second tone corresponding to said second tone data for at least said first predetermined period, wherein said first predetermined period is independent of said second tone duration.

9. The device of claim 8, wherein said first tone is a DTMF digit.

10. The device of claim 8, wherein said first predetermined period is approximately 50 msec.

11. The device of claim 8, wherein said second predetermined period is approximately 50 msec.

12. The device of claim 8, wherein said first tone data is a part of an NTE packet.

13. The device of claim 12, wherein said second tone data is a part of said NTE packet.

14. The device of claim 8, wherein said second tone is generated until an end of tone data is received.

15. A tone generation method for use in a communication system, said method comprising:
receiving a first tone data and a first tone duration, said first tone data being indicative of a first tone;
buffering said first tone data in a buffer;
retrieving said first tone data from said buffer;
generating said first tone corresponding to said first tone data;
starting a first timer when said first tone starts being generated, said first timer being set for a first predetermined period, said first predetermined period being independent of said first tone duration;
restarting said first timer when a keep-alive data for said first tone is received; and
stopping to generate said first tone when said first timer expires.

16. The method of claim 15, wherein said first predetermined period is approximately 200 msec.

17. The method of claim 15, wherein said first tone is a DTMF digit.

18. The method of claim 15, wherein said first tone data is a part of an NTE packet.

19. The method of claim 15 further comprising:
receiving a second tone data indicative of a second tone prior to said stopping to generate said first tone;
buffering said second tone data in said buffer;
determining an elapsed time since said starting said first timer;
ceasing to generate said first tone when said elapsed time exceeds a second predetermined period;
waiting for a third predetermined period;
retrieving said second tone data from said buffer; and
generating said second tone corresponding to said second tone data.

20. The method of claim 19, wherein said first and second tones are DTMF digit digits.

21. The method of claim 19, wherein said second predetermined period is approximately 50 msec.

22. The method of claim 19, wherein said third predetermined period is approximately 50 msec.

23. A tone generation device for use in a communication system, said device comprising:
a receiver capable of receiving a first tone data and a first tone duration, said first tone data being indicative of a first tone;
a memory;
a first timer capable of being set for a first predetermined period, said first predetermined period being independent of said first tone duration; and
a processor capable of storing said first tone data in said memory;
wherein said processor retrieves said first tone data from said memory and generates said first tone corresponding to said first tone data, starts said first timer when said first tone starts being generated, restarts said first timer when a keep-alive data for said first tone is received and stops to generate said first tone when said first timer expires.

24. The device of claim 23, wherein said first predetermined period is approximately 200 msec.

25. The device of claim 23, wherein said first tone is a DTMF digit.

26. The device of claim 23, wherein said first tone data is a part of an NTE packet.

27. The device of claim 23 further comprising:
a second timer for use to determine an elapsed time since said processor started said first tone;
wherein said receiver is capable of receiving a second tone data indicative of a second tone, and wherein said processor is capable of storing said second tone in said memory, and wherein said processor ceases to generate said first tone when said elapsed time exceeds a second predetermined period, waits for a third predetermined period, retrieves said second tone data from said memory, and generates said second tone corresponding to said second tone data.

28. The device of claim 27, wherein said first and second tones are DTMF digit digits.

29. The device of claim 27, wherein said second predetermined period is approximately 50 msec.

30. The device of claim 27, wherein said third predetermined period is approximately 50 msec.

31. A tone generation method for use in a communication system, said method comprising:
receiving a first tone data and a first tone duration, said first tone date data being indicative of a first tone;
buffering said first tone data in a buffer;
receiving a second tone data and a second tone duration, said second tone date data being indicative of a second tone;
buffering said second tone data in said buffer;
establishing a fixed tone period and a fixed silence period independent of said first tone duration and said second tone duration;
retrieving said first tone data from said buffer;
generating said first tone corresponding to said first tone data for said fixed tone period:
waiting for said fixed silence period after said generating said first tone;
retrieving said second tone data from said buffer; and
generating said second tone corresponding to said second tone data for said fixed tone period.

32. The method of claim 31, wherein said first tone is a DTMF digit.

33. The method of claim 31, wherein said fixed tone period is approximately 50 msec.

34. The method of claim 31, wherein said fixed silence period is approximately 50 msec.

35. The method of claim 31, wherein said first tone data and said first tone duration are a part of an NTE packet.

* * * * *

UNITED STATES PATENT AND TRADEMARK OFFICE
CERTIFICATE OF CORRECTION

PATENT NO. : 6,961,424 B1  
DATED : November 1, 2005  
INVENTOR(S) : Vialle et al.

It is certified that error appears in the above-identified patent and that said Letters Patent is hereby corrected as shown below:

Column 12,
Lines 40 and 43, delete "date".

Signed and Sealed this

Twenty-third Day of May, 2006

JON W. DUDAS
*Director of the United States Patent and Trademark Office*